United States Patent
Nealon et al.

(10) Patent No.: US 7,232,273 B2
(45) Date of Patent: Jun. 19, 2007

(54) METHOD AND APPARATUS FOR APPLYING SEALANT TO FASTENERS

(75) Inventors: Joseph M. Nealon, Woodland Hills, CA (US); Stephen J. Schultz, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 10/909,015

(22) Filed: Jul. 30, 2004

(65) Prior Publication Data

US 2006/0024122 A1    Feb. 2, 2006

(51) Int. Cl.
*B05C 11/00* (2006.01)

(52) U.S. Cl. ........................ 401/266; 401/265

(58) Field of Classification Search ................ 401/265, 401/266, 289, 287, 270, 176, 180; 118/410, 118/DIG. 11; 222/566
See application file for complete search history.

(56) References Cited

U.S. PATENT DOCUMENTS

| 2,104,086 | A | * | 1/1938 | Lines | .......................... 401/265 |
| 2,345,534 | A | * | 3/1944 | Grim | .......................... 118/710 |
| 3,519,364 | A | * | 7/1970 | Truhan | ........................ 401/177 |
| 6,422,777 | B1 | * | 7/2002 | Landrau et al. | ............. 401/266 |
| 6,592,282 | B2 | * | 7/2003 | Fontanet et al. | ............ 401/266 |
| 2006/0013643 | A1 | * | 1/2006 | Carruth et al. | .............. 401/266 |

* cited by examiner

*Primary Examiner*—Khoa D. Huynh
(74) *Attorney, Agent, or Firm*—Armstrong Teasdale LLP

(57) ABSTRACT

A sealant dispenser system and method for applying sealant to fasteners. The sealant dispenser system comprising a syringe that engages a dispenser head, wherein the dispenser head has a plurality of dispenser feed channels that receive sealant from an intermediate dispenser conduit, which receives sealant from the sealant distribution conduit. The sealant distribution conduit is configured to receive a needle of a syringe which, when filled with sealant, can be engaged to distribute sealant from the syringe barrel through the sealant distribution conduit, through the intermediate dispenser conduit and through the dispenser feed channels and out of the dispenser feed channel orifices. The dispenser feed channels and the dispenser feed channel orifices are positioned proportional distances apart to allow for distribution of sealant around the entire edge of a fastener.

9 Claims, 4 Drawing Sheets

METHOD AND APPARATUS FOR APPLYING SEALANT TO FASTENERS

TECHNICAL FIELD

This application generally relates to sealant dispensers, delivery systems and methods for applying sealant compositions, such as RTV's, silicones etc., to fasteners. The application further relates to a method of applying sealant compositions to fasteners.

BACKGROUND OF THE INVENTION

In many applications, particularly aerospace, where a fastener will be installed in an assembly, typically, a sealant is applied around the fastener at the same time. Numerous dispensers, applicators and dispensing kits for dispensing various materials, including sealants and adhesives are known. In some manufacturing processes, such dispensers and applicators may be machine operated in applying sealants. Generally, in the aerospace industry, such sealants are applied manually. The problem with manual application is that the process is messy and time-consuming. It represents a significant portion of assembly cost and schedule in the assembly process. Generally, manual application of sealant around fasteners, such as nuts, bolts and screws, is accomplished with the use of a syringe. The syringe applicator is a thin needle like apparatus that must be guided around the edges of the fastener so that the sealant may be applied in the appropriate position. Because sealant application by syringe is manual, the level of mess and time needed for application is operator dependent. Manual application also introduces the human factor into the process of applying sealant, requiring a steady hand and substantially increasing the costs associated with this aspect of the manufacturing process. The person applying the sealant needs to be careful and make sure that sealant is applied in accordance with the specifications, which do not allow bubbles, voids or inclusions. In addition, due to the specification requirements concerning the amount of sealant required around a fastener, the sealant needs to be of sufficient height, width, and thickness to prevent the entry of moisture, or for assemblies that are also integral fuel tanks to seal any potential leak paths.

It is desirable to use a sealant applicator that removes the operator dependent factor from the application process and allows for sealant to be applied quickly and consistently in accordance with specification requirements. There is a need for a method of applying sealant and an applicator that applies sealant around fasteners and structures of similar geometry that applies sealant in accordance specification requirements. Such a method and dispenser would reduce labor costs and add consistency to the application of sealant. Such a system would need to solve the above-described problems by providing a sealant dispenser system and method for applying sealant to fasteners in a more cost effective and efficient manner while reducing the mess and waste associated with applying sealant through the use of prior systems.

SUMMARY OF THE INVENTION

The present invention comprises a sealant dispenser comprised of a dispenser head configured with a plurality of dispenser feed channels formed at a first end of the dispenser head, at least one dispenser conduit formed within the dispenser head that intersects the plurality of dispenser feed channels and a dispenser manifold formed within the dispenser head that intersects the at least one dispenser conduit. The plurality of dispenser feed channels have orifices that are positioned within a dispenser channel clearance cavity, wherein the dispenser channel clearance cavity is sized and has geometry appropriate for the type of fastener to which sealant is being applied. Each of the plurality of dispenser feed channels receives sealant from the at least one dispenser conduit which receives sealant from the dispenser manifold. The dispenser manifold is connected to a second end of a syringe reception chamber formed within the dispenser head, wherein a first end of the syringe reception chamber is at the second end of the dispenser head. The syringe reception chamber is configured to receive a needle of a syringe whereby the syringe plunger assembly is engaged and forces sealant from the syringe barrel through the manifold, through the at least one dispenser conduit and through the dispenser feed channels and out of the dispenser feed channel orifices. The dispenser feed channels and orifices are positioned proportional distances apart to allow for distribution of sealant around the entire edge of a fastener.

DETAILED DESCRIPTION

The present invention is directed to a sealant dispenser system and method for applying sealant to fasteners. The embodiment of the dispenser system of the present invention is comprised of a sealant dispenser head 100 and a syringe assembly of the type illustrated in FIGS. 1 and 4. The sealant dispenser head 100 is comprised of a plastic material, and is manufactured using an SLA stereolithography process. The use of the SLA stereolithography process allows for the manufacture of custom sealant heads customized for use with fasteners of varying geometry and shape. The ability to generate sealant heads customized to the geometry and shape of the fastener to which sealant needs to be applied enhances the effectiveness of the sealant head. In addition, use of the SLA stereolithography process provides for rapid prototyping of sealant dispenser heads 100 so as to allow for quicker prototype manufacture and modifications. Potential alternative methods, such as injection molding, that may be used to manufacture sealant dispenser heads 100, are too expensive. Moreover, potential alternative processes such as injection molding have shown themselves to be ineffective in the manufacture of dispensing heads of the type described because of the size and geometry of the sealant manifold and other distribution passages.

Figure 2:
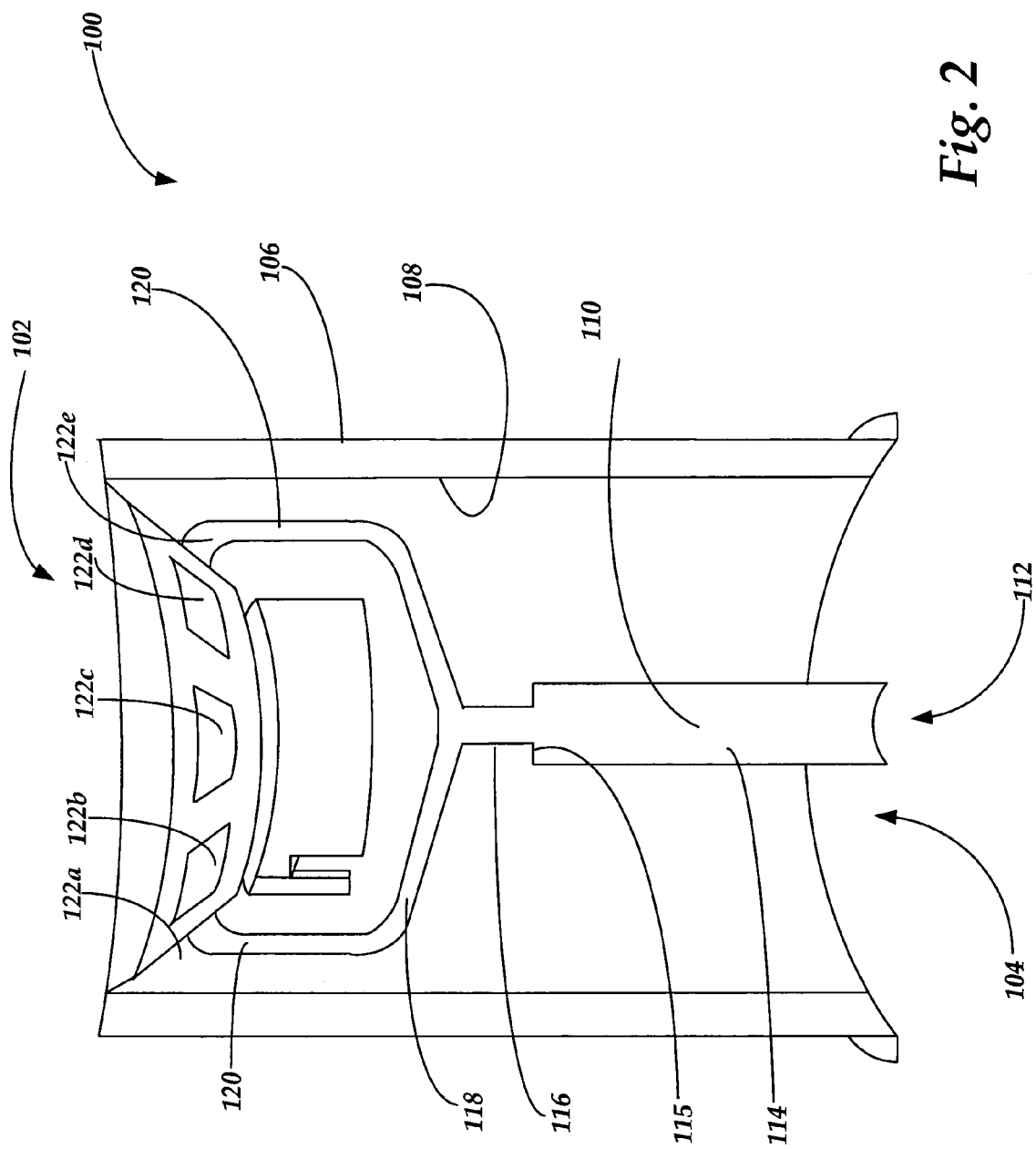
FIG. 2 is a cross-sectional view of the embodiment of the dispenser head shown in FIG. 1.
Figure 3:
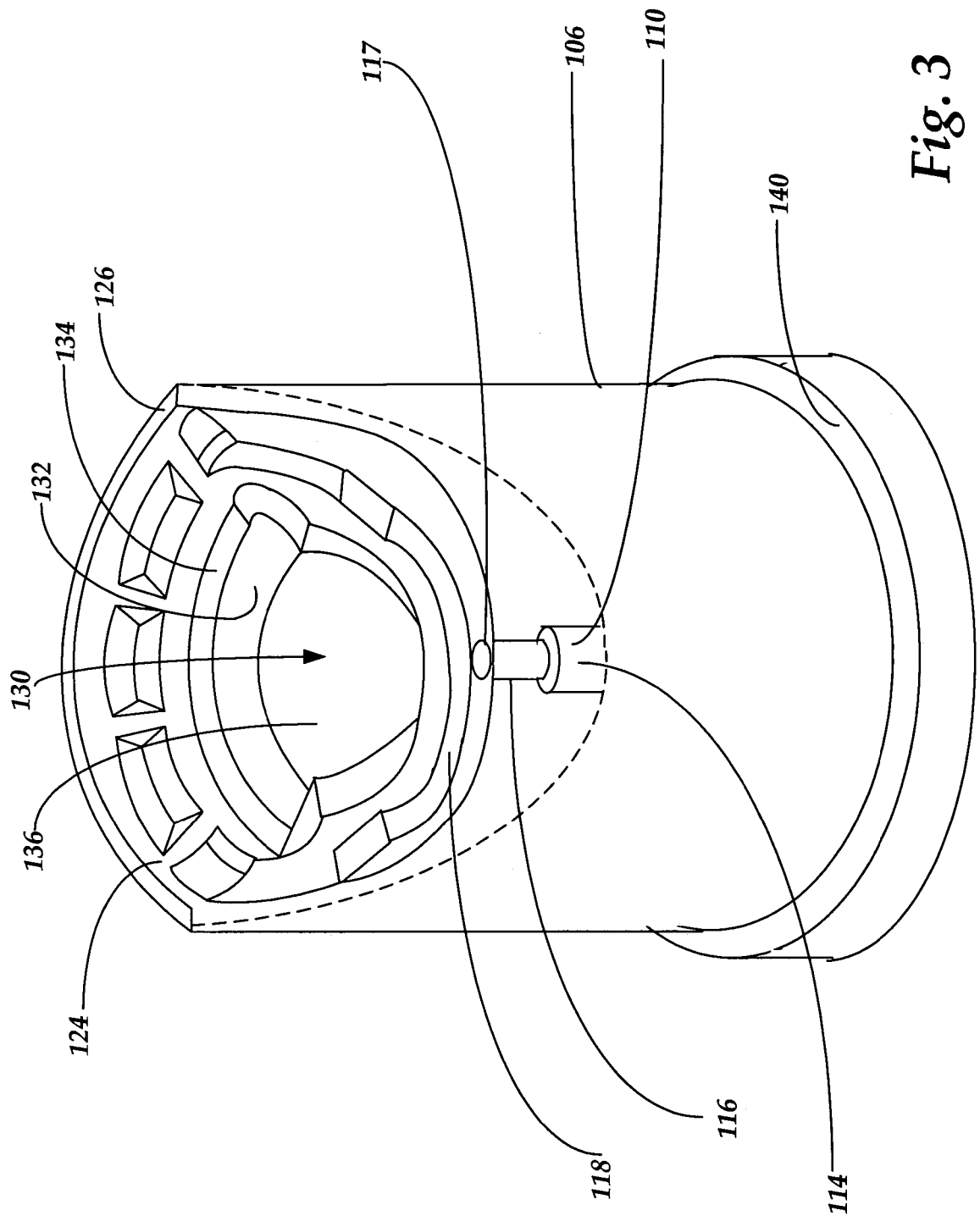
FIG. 3 is a partial sectional view of the embodiment of the dispenser head shown in FIG. 1.

As FIGS. 2 and 3 illustrate, the sealant dispenser head 100 is configured so as to include a plurality of dispenser feed channels 120 formed at a first end 102 of the dispenser head 100, at least one intermediate dispenser conduit 118 formed within the dispenser head 100 that intersects the plurality of dispenser feed channels 120 and a dispenser distribution channel 110 formed within the dispenser head 100 that intersects the at least one intermediate dispenser conduit 118. The plurality of dispenser feed channels 120 each has dispenser feed channel orifices 122 that are positioned within a dispenser clearance cavity 130, wherein the dispenser clearance cavity 130 is sized and has geometry appropriate for the type of fastener to which sealant is being applied. Each of the plurality of dispenser feed channels 120 receives sealant from the at least one intermediate dispenser conduit 118 which receives sealant from the dispenser distribution channel 110. The dispenser distribution channel 110 is comprised of a syringe reception chamber 114 and a dispenser manifold 116, wherein a first end of the syringe reception chamber 114 is at the second end 104 of the dispenser head 100. The syringe reception chamber 114 is configured to receive a needle of a syringe. To apply sealant, the syringe plunger assembly is engaged and forces sealant from the syringe barrel through the dispenser manifold 116, through the at least one intermediate dispenser conduit 118 and through the plurality of dispenser feed channels 120 and out of the sealant distribution channel orifices 122. The plurality of dispenser feed channels 120 and orifices 122 are positioned proportional distances apart to allow for distribution of sealant around the entire edge of a fastener.

Figure 4:
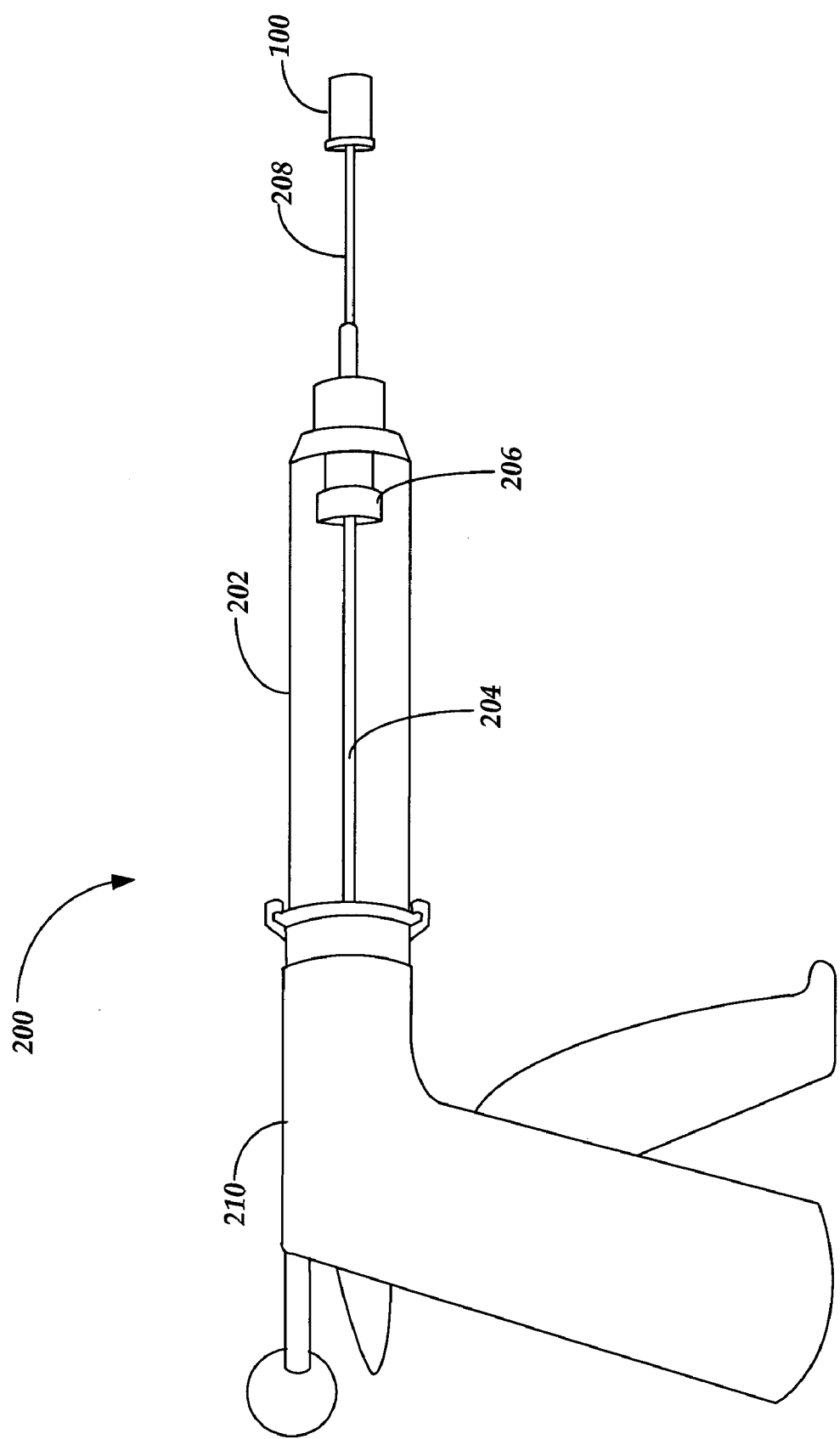
FIG. 4 is a perspective view of one embodiment of the dispenser head of the present invention engaged with a syringe gun assembly.

As FIGS. 3 and 4 illustrate, the sealant dispenser head 100 has a first end 102 and a second end 104, wherein the first end includes the sealant distribution channel orifices 122 configured within the dispenser channel clearance cavity 130. The second end of the sealant dispenser head 100 includes the needle entry orifice of the syringe reception chamber 114. The body of the sealant dispenser head 100, manufactured with an SLA stereolithography manufacturing process, is further comprised of a dispensing head outer wall 106 and has a sealant dispensing head inner wall 108. Configured within the interior of the sealant dispensing head 100 is the plurality of dispenser feed channels 120, an intermediate dispenser conduit 118 and a dispenser distribution channel 110, all of which are interconnected. The dispenser feed channels 120 intersect the at least one intermediate dispenser conduit 118 at a first end of the at least one intermediate dispenser conduit 118 and the sealant distribution conduit 110 intersects the intermediate dispenser conduit 118 at a second end of the intermediate dispenser conduit 118. The dispenser distribution channel 110 has a first end 112 that begins at the sealant dispensing head second end 104 and a second end that intersects the at least one intermediate dispenser conduit 118. The dispenser distribution channel 110 is comprised of a syringe reception chamber 114 and a sealant manifold 116, both of which are elongated cylindrical cavities formed into the interior of the dispenser head. It is to be understood that the configuration of the sealant manifold 116 may also be of varying geometries and is not limited to being cylindrical. Notwithstanding, in the preferred embodiment, the sealant manifold 116 is cylindrical. It is also to be understood that the configuration of the syringe reception chamber 114 is dependent upon the syringe needle and may be of varying geometry. In the preferred embodiment, the syringe reception chamber 114 is cylindrical. The syringe reception chamber 114 has a diameter that is larger than the diameter of the sealant manifold 116, which creates an annular flange 115 which can be used to prevent the syringe needle from being inserted too far into the interior of the sealant dispenser head 100. Alternatively, the diameter of the sealant manifold 116 is simply of a diameter smaller than the diameter of the needle inserted into the syringe reception chamber 114, thereby preventing the syringe needle from extending to far into the sealant manifold 116. In the present embodiment, the syringe needle does not extend very far into the sealant manifold 116. However, it is to be understood that in some embodiments, the needle may actually extend some distance into the sealant manifold 116. To the extent the syringe needle does extend some distance into to the sealant manifold 116, the system is still within the scope of the present invention.

The dispenser distribution channel 110 has a first end 112 and a second end 117, wherein the second end 117 ends at the point of intersection with the intermediate dispenser conduit 118, which in the present embodiment is a conical reservoir as illustrated in FIG. 2, and sometimes referred to herein as a dispenser reservoir channel. Notwithstanding, it is to be understood that the intermediate dispenser conduit 118 may be of any shape, size and or configuration, so long as it dispenses sealant or other fluids received from the sealant distribution channel 110 up through itself and into the plurality of dispenser feed channels 120 and out of the dispenser head 100 through the dispenser feed channel orifices 122.

The plurality of dispenser feed channel orifices 122 are positioned within a dispenser clearance cavity 130, wherein the dispenser clearance cavity 130 is sized and has geometry appropriate for the type of fastener to which sealant is to be applied. It is contemplated that the present invention may be used with fasteners of all types, including but not limited to bolt heads (comprising at least the following: pan head, flat head, round head, oval head, fillister head, binding head, truss head, holt head, one-way head, Phillips finishing washer head, washer head, undercut head, square shoulder screws, indented hexagon, hexagon washer head acron head, hexagon head, welding screw, flat head welding screw, T welding screw), screw heads (comprising at least the following: countersunk head, round head, raised head, square coach, hexagonal coach), and nuts (comprising at least the following: hex nut, hex cap nuts low crown, K-lock nuts, nylon insert nuts and wing nuts). Accordingly, the geometry and dimensions of the dispenser clearance cavity 130 is dependent upon the type of fastener the dispenser head 100 is being manufactured to be used in association with. It is to be understood that the geometry and dimensions of the dispenser clearance cavity 130 may be of any shape and size necessary to provide even and smooth application of sealant to fasteners.

Figure 1:
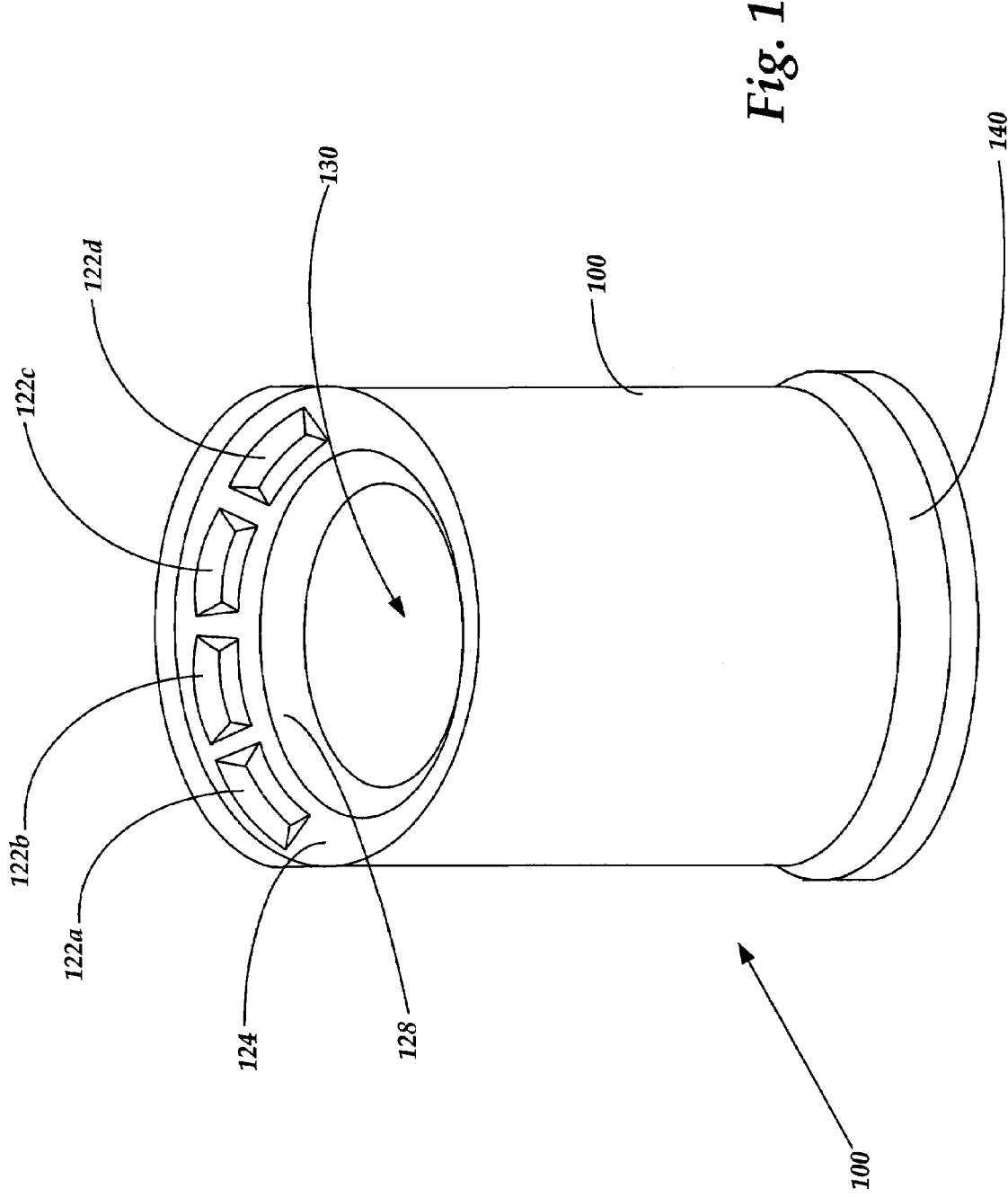
FIG. 1 is a perspective view of one embodiment of a dispenser head according to an embodiment of the present inventions.

In the embodiment illustrated in FIGS. 1–3, the dispenser clearance cavity 130 is circle shaped. In an alternative embodiment, the dispenser clearance cavity 130 may be of a hexagonal shape and thereby be used for sealing hex nuts. Regardless of the shape of the dispenser clearance cavity 130, be it hexagonal or circular in nature, in the present embodiment, the sealant distribution annular wall assembly 124 is angled outward and away from the fastener to provide clearance room so that the sealant may flow from the dispenser feed channel orifices 122 around the fastener. The clearance cavity 130 is comprised of a clearance cavity ceiling 136 and a clearance cavity annular sidewall 132 extending from the edge of the clearance cavity ceiling 136. The clearance cavity annular sidewall 132 extends to the o-ring grove 134, which is positioned between the sealant distribution annular wall assembly 124 and the clearance cavity annular sidewall 132. An o-ring (not shown) is positioned within the o-ring grove 134 to provide a means for preventing sealant from flowing upward and along the clearance cavity annular sidewall 132. The o-ring causes sealant to flow downward and along the edge of a fastener.

As FIG. 4 illustrates, the sealant dispensing system of the present invention comprises a syringe 200 and dispenser head 100. The syringe utilized in the present embodiment is a syringe gun assembly 200, which includes a syringe barrel 202, a plunger shaft 204, plunger assembly 206, syringe needle 208 and syringe gun 210. As illustrated, the syringe needle 208 is inserted into the second end 104 of the sealant dispenser head 100 and engages the dispenser distribution conduit 110 first end 112. The needle is inserted fully into the syringe reception chamber 114 of the dispenser distribution conduit 110 and distributes sealant from the syringe barrel 202, through the dispenser distribution conduit 110, through the intermediate dispenser conduit 118 and through the dispenser feed channels 120 and out of the dispenser feed channel orifices 122.

The method of applying sealant to fasteners includes utilizing a syringe 200 and a sealant dispensing head 100, wherein the sealant dispensing head 100 is positioned over a fastener and a needle of the syringe 200 is inserted into the sealant dispensing head 100. The syringe is engaged to cause sealant to flow from the syringe barrel 202 through the sealant distribution conduit 110, through the intermediate dispenser conduit 118 and through the dispenser feed channels 120 and out of the dispenser feed channel orifices 122.

While the invention has been particularly shown and described with reference to preferred embodiment thereof, it will be understood by those skilled in the art that various other changes in the form and details may be made therein without departing from the spirit and scope of the invention. The foregoing description of the exemplary embodiments of the invention has been presented for purposes of illustration and description. It is not intended to be exhaustive or to limit the invention to the precise form disclosed. Man modifications and variations are possible in light of the above teaching. It is intended that the scope of the invention be limited not with this detailed description but rather by the claims appended hereto.

We claim:

1. A sealant dispenser comprising:
    a portable dispenser head, supported by said dispenser, and configured with the following components formed therein:
    a plurality of dispenser feed channels formed at a first end of the dispenser head, each dispenser feed channel having at least one dispenser feed channel orifice;
    at least one intermediate dispenser conduit; and
    a dispenser manifold, said plurality of dispenser feed channels and orifices concentric about an axis associated with said dispenser manifold;
    wherein the at least one intermediate dispenser conduit intersects at least one of the plurality of dispenser feed channels, at an end opposite the dispenser feed channel orifices, and the dispenser manifold, wherein the dispenser manifold is a substantially equal distance from each of the plurality of dispenser feed channel orifices, and wherein each of the plurality of dispenser feed channels receives sealant from the at least one intermediate dispenser conduit, wherein the at least one intermediate dispenser conduit is configured to receive sealant from the dispenser manifold.

2. The sealant dispenser of claim 1, wherein the dispenser head is configured with a clearance cavity formed into the first end of the dispenser head, wherein the clearance cavity is sized to fit over a fastener so that the plurality of dispenser channels are positioned to distribute sealant evenly around the edge of the fastener.

3. The sealant dispenser of claim 1, wherein the dispenser head is further configured with a syringe reception chamber, wherein a first end of the syringe reception chamber is at a second end of the dispenser head and a second end of the syringe reception chamber is attached to the dispenser manifold.

4. The sealant dispenser of claim 1, wherein the dispenser head is further configured to receive a syringe needle, wherein the syringe needle is positioned to force sealant into the manifold.

5. A sealant dispensing system comprising:
    a syringe;
    a dispenser head, supported by said syringe, and configured with the following components formed therein:
    a plurality of dispenser feed channels formed at a first end of the dispenser head;
    a dispenser reservoir channel, said dispenser feed channels located concentrically around an axis associated with said dispenser reservoir channel; and
    a dispenser manifold;
    wherein the dispenser reservoir channel intersects at least one of the plurality of dispenser feed channels and said dispenser manifold, and wherein each of the plurality of dispenser channels receives sealant from the dispenser reservoir channel, wherein the syringe engages a second end of the dispenser head, the second end opposite the first end, and is inserted into the dispenser manifold.

6. The sealant dispenser of claim 5, wherein the dispenser head is configured with a clearance cavity formed into the first end of the dispenser head, wherein the clearance cavity is sized to fit over a fastener so that the plurality of dispenser channels are positioned to distribute sealant evenly around the edge of the fastener.

7. The sealant dispenser of claim 5, wherein the dispenser head is further configured with a syringe reception chamber, wherein a first end of the syringe reception chamber is at the second end of the dispenser head and a second end of the syringe reception chamber is attached to the dispenser manifold.

8. The sealant dispenser of claim 5, wherein the dispenser head is further configured to receive a syringe needle, wherein the syringe needle is positioned to force sealant into the manifold.

9. A method of distributing sealant around a fastener comprising:
    providing a sealant dispenser according to claim 1;
    positioning the sealant dispenser over a fastener; and
    engaging the sealant dispenser with a syringe and forcing sealant out of the plurality of dispenser channels and around the fastener.

* * * * *